Patented Oct. 28, 1952

2,615,845

UNITED STATES PATENT OFFICE 2,615,845

LUBRICATING OIL ADDITIVES

Samuel B. Lippincott and Louis A. Mikeska, Westfield, N. J., assignors to Standard Oil Development Company, a corporation of Delaware No Drawing. Application August 2, 1948, Serial No. 42,155

4 Claims. (Cl. 252—56)

This invention relates to novel chemical products and to processes for preparing and using the same. More particularly, it relates to esterified, amidated and imidated high molecular weight copolymers of unsaturated dibasic acids and their derivatives with other olefinic compounds. The esterification, amidation or imidation agent which will be referred to as a modification agent should be aliphatic and may contain a short or long aliphatic chain depending on whether or not the olefinic compound supplies sufficient carbon and hydrogen to render the final product oil soluble. These novel modified copolymers are especially useful for improving the pour point, viscosity index and other properties of mineral lubricating oils and some are good lubricants in their own right.

One object of the present invention is the production of pour depressants of high potency in a wide variety of lubricating oils. Another object is to produce pour depressants having good pour stability under field conditions of storage. A further object is the production of a lubricating oil additive which not only lowers the pour point but also increases the viscosity index of the oil so that the additive is not only a good pour depressant when used in small amounts but will also be an effective pour depressant when used in higher concentrations as a viscosity index improver. Still another object of the invention contemplates the use of these novel esterified copolymers as lubricating oils.

Broadly, the present invention comprises the production of oil soluble derivatives of copolymers of ethylene-1,2-dicarboxylic acids and their derivatives with other unsaturated compounds such as olefins, vinyl ethers, vinyl esters and the like. The dicarboxylic acids which may be employed include maleic acid, fumaric acid, the mono or dichloro substituted maleic and fumaric acids, alkylated maleic and fumaric acids, mono and diphenyl maleic, benzyl maleic, dibenzyl maleic, ethyl maleic or any similar acids containing a double bond in the chain between the two carboxyl groups such as mesaconic and citraconic. Acids where the double bond has shifted from the 1,2 position, such as itaconic and glutaconic acid may also be used. The anhydrides of each of the above acids capable of anhydride formation may also be used. After the copolymerization, the copolymer is modified with an alcohol or amine. Among the unsaturated compounds useful in the copolymerization with ethylene-1,2-dicarboxylic acid or its derivatives are (1) ordinary olefins such as ethylene, propylene, butylene, octylene and octadecene; (2) unsaturated acids such as acrylic acid, methacrylic acid, crotonic acid, undecylenic acid, oleic acid, and their esters; (3) unsaturated esters such as vinyl acetates, allyl stearate and the like; (4) unsaturated ethers such as vinyl dodecyl ether, butyl allyl ether and the like; (5) sulfides corresponding to the above ethers; (6) unsaturated chlorides such as vinyl and methallyl chloride.

In general, when an olefin is copolymerized, the two monomers enter into the copolymer at approximately an equimolar ratio. The copolymers are generally insoluble in lubricating oil except when a high molecular weight long chain olefin has been used in the copolymerization. However, they can be made soluble by modification with various aliphatic substances such as alcohols, primary amines, secondary amines, mercaptans and the like. When condensed with an alcohol, the initial product is a half ester. The remaining carboxyl groups may be left as such or may be esterified with the same or a different alcohol or they may also be neutralized with ammonia, amines and the like, and the salts so formed may be converted to amides by the removal of water. If the copolymer is treated with a primary amine, the resulting product is at least partly an imide, i. e., a RN= group replaces the oxygen in the acid anhydride groups of the copolymer. If it is treated with a secondary amine, the resulting product is probably an amide. The copolymer may also be condensed with a mercaptan to yield the half thioester which in turn may be further esterified with an alcohol or condensed with ammonia or an amine. If the copolymer is oil soluble, low molecular weight modifying agents such as ethyl alcohol and methylamine may be used. However, if the copolymer is insoluble, the modifying agent must carry sufficient carbon and hydrogen to render the final product oil soluble if it is to be used as an oil additive. Ammonia, amine or even metal salts of the copolymers or of the partially esterified copolymers or of the partially amidated or imidated copolymers may also be used as addition agents for lubricating oils.

The agent used for esterification, amidation or imidation may be either low molecular weight such as ethyl alcohol, ethyl amine or diethylamine or high molecular weight such as octadecyl alcohol, octadecyl amine or dioctadecylamine. If a high molecular weight unsaturated compound has been used in the copolymerization with the dibasic acid, then a low molecular weight agent may be used for the modification step. On the other hand, if a low molecular weight olefin has been copolymerized with the dibasic acid, it may be necessary to modify with a high molecular weight agent in order to obtain good oil solubility and high potency as a pour point depressant.

One very suitable commercially available mixed alcohol suitable for esterification of the copolymer is a product obtained by hydrogenation of coconut oil. Such a product is sold commercially under the trade name "Lorol" and is a mixture of saturated straight chain alcohols ranging from 10 to 18 carbon atoms, but having a major proportion of lauryl alcohol which has 12 carbon atoms. Other related products are made by separating this material, which may be considered as a crude mixture, into several different fractions having a relatively higher proportion of the higher, lower or medium constituent thereof. The composition of the commercial "Lorol" per se and other related products "Lorol B" and "Lorol R" is approximately as follows:

|  | Lorol | Lorol B | Lorol R |
| --- | --- | --- | --- |
|  | Percent | Percent | Percent |
| $C_{10}$ | 4 | 3 | 1 |
| $C_{12}$ | 55.5 | 46 | 85 |
| $C_{14}$ | 22.5 | 24 | 13 |
| $C_{16}$ | 14 | 10 | 1 |
| $C_{18}$ | 3 | 17 | 1 |

In preparing the copolymer, approximately equimolar quantities of the dibasic acid derivative and the olefin are used. Polymerization catalysts may or may not be used. Among the useful catalysts are: benzoyl peroxide, tert.-butyl hydroperoxide, di-tert.-butyl peroxide, cumene peroxide, sunlight, ultra violet light, sodium and sodium amalgam. Peroxide catalysts are generally preferred. When a high molecular weight olefin is copolymerized, monomeric materials are generally charged into a flask with a diluent and catalyst and are heated to approximately 40 to 200° C., preferably 70 to 100° C. for a period of a few minutes to 24 hours. The modification agent is generally added with a suitable diluent and a catalyst such as sulfuric acid, phosphoric acid, hydrochloric acid, benzene sulfonic acid and p-toluene sulfonic acid. Water of esterification is removed as an azeotrope of the diluent. At the end of the reaction, the product is water-washed until neutral and the solvents are removed by vacuum distillation. Modification may result in partial or complete esterification, amidation or imidation.

A copolymer derived from a low molecular weight olefin may be formed by dissolving the dibasic acid derivative in a suitable diluent, heating to 50 to 200° C. adding catalyst dissolved in a solution of the same diluent and passing the olefin in gaseous phase into the mixture. Unreacted olefin may be returned to the system by a low temperature reflux condenser. The copolymerization may also be carried out under pressure in an autoclave.

During the copolymerization, it is preferred to exclude oxygen or air by any suitable means, such as by blowing the reaction mixture or the reaction vessel with an inert gas such as nitrogen or carbon dioxide, or by displacing the air by refluxing solvent.

The products of this invention may be used in lubricating oils in concentrations ranging from about 0.05% to 5% or more, preferably from 0.1% to 0.5% when pour depressing is the primary object, and a larger concentration for example, from 0.5% to 10% when viscosity index improvement is the primary object. The oil base stock in which the modified copolymers may be used may be not only from the paraffinic oils which require pour depressors but also from naphthenic or mixed lubricating oils which are desired to be improved in viscosity index or blends of various types of oil where substantial improvement in both pour depressing and V. I. improvements are desired. The modified copolymers may also be used in greases which contain metal salts or in paraffin wax or waxy compositions or in lighter liquid hydrocarbon oil products such as diesel fuel base stocks which are often highly paraffinic in nature and require pour depressing or in other light oils such as domestic heating oil base stock mineral seal oil, refined kerosene or the like. The copolymers may also be used in synthetic lubricants such as esters and polyethers. It is also contemplated that certain of these modified copolymers may be used as lubricating oils in their own right.

When the modification of the copolymer is accomplished by condensing said copolymer with a primary or secondary amine, the same considerations with respect to chain length apply as they do with respect to esterification agents. That is to say, if a high molecular weight or long chain unsaturated compound has been used in the copolymerization step a low molecular weight modification agent may be used. On the other hand, if a low molecular weight olefin has been copolymerized with the dibasic acid, it may be necessary to modify with a high molecular weight or long chain agent.

The amine or imine is generally added with a suitable diluent at a temperature ranging from 70° C. to 200° C., preferably from 100° to 150° for a period of 2 to 20 hours.

Copolymer products amidated or imidated are pour depressants and viscosity index improvers. They also have utility as oxidation inhibitors.

Generally the best pour depressants have been prepared from the copolymer of an acid anhydride and a long chain olefin modified with a long chain alcohol or amine. The best V. I. improvers have been prepared from the copolymer of an acid anhydride and an olefin of less than eight carbon atoms modified with a long chain alcohol or amine.

It will be understood that although specific quantities of reactants are set forth hereinafter, it appears that the proportions of reactants may vary from about 1 to 4 mols of olefinic monomer to about one mol of dicarboxylic acid or anhydride. Similarly, the modification agent may range from 1 to 4 mols per mol of copolymer. The catalyst, where used, may vary from about 0.1 to 10% by weight based on the reactants.

In preparing the lubricating oil or other compositions containing the novel copolymers of this invention, one may also add other conventional additives such as dyes, antioxidants, etc. or one may add other types of pour depressants such as the wax naphthalene condensation product or wax phenol condensation products, as well as other viscosity index improvers such as polybutene, polyacrylates and the like.

The invention will be better understood from a consideration of the following examples:

EXAMPLE 1

A stainless steel bomb was charged with 25 g. of maleic anhydride, ¾ g. of benzoyl peroxide, 100 ml. of benzene and 37 g. of propylene. The bomb was sealed and rocked while the temperature increased to 70° C. over a period of two hours. The reaction mixture was maintained at this temperature for 4½ hours. The bomb was cooled and the product transferred to a mortar and ground under benzene. The product was collected on a suction filter, washed with ether, and air dried. It weighed 32 g. and was in the form of a white powder. Analyses (59.11% C and 5.81% H) indicated a mol ratio of maleic anhydride to propylene of about 1.05.

31 g. of the copolymer, 115 g. of "Lorol B" alcohol and 200 ml. of dioxane were charged into a flask and heated to boiling. After about 20 hours refluxing the mixture became homogeneous. 1 g. of p-toluene sulfonic acid monohydrate was added and the dioxane was distilled to a pot temperature of 160° during six hours. The pressure was then reduced to about 15 mm. and the refluxing continued using an air cooled condenser so that dioxane and water could escape from the reaction zone. The mixture was under these conditions for 8 hours. The product was taken up in benzene, washed with water, dried with sodium sulfate, and concentrated by distillation, finishing at 200° C. at 1-2 mm. pressure. The resulting product (120 g.) was a very viscous, amber colored fluid. Portions of it were blended in test oil A and also in test oil B. Pour point and viscosity data of the blends are given in the table below. Test oil A is a conventionally refined Mid-Continent distillate plus 3½% Pennsylvania Bright Stock, SAE Grade 10 having a viscosity of 43.8 S. S. U. at 210° F. and a viscosity index of 98. Test oil B is a solvent extracted Mid-Continent neutral SAE Grade 10 having a viscosity of 44 S. S. U. at 210° F. and a viscosity index of 113.

*Table I*

IN TEST OIL A

| Conc., Percent | A. S. T. M. Pour Pt., °F. | Viscosity, S. S. U. | | |
|---|---|---|---|---|
| | | at 100° F. | at 210° F. | V. I. |
| 0 | +30 | 159.6 | 43.8 | 98 |
| ¼ | −15 | 167.2 | 44.8 | 107 |
| ½ | −15 | 176.7 | 45.8 | 111 |
| 1 | −10 | 193.8 | 47.9 | 112 |

IN TEST OIL B

| Conc., Percent | A. S. T. M. Pour Pt., °F | Viscosity, S. S. U. | | |
|---|---|---|---|---|
| | | at 100° F. | at 210° F. | V. I. |
| 0 | +5 | 152.4 | 44.0 | 113 |
| ¼ | −5 | 158.7 | 44.9 | 118 |
| ½ | −5 | 166.4 | 45.9 | 124 |
| 1 | 0 | 181.6 | 48.0 | 131 |

EXAMPLE 2

49 grams of maleic anhydride (½ mol), 132 grams of 1-octadecene (0.52 mol), and 200 ml. of xylene were charged into a flask and heated to 130° C. 3 grams of benzoyl peroxide in 60 ml. of xylene was added dropwise over a period of 2 hours with occasional stirring. Solvent and unreacted monomers were removed by heating to 200° C. at 1 mm. pressure. The residue (76 g.) was a viscous syrup. To this residue was added 500 ml. of benzene, 93 grams of Lorol B alcohol and 3 grams of p-toluene sulfonic acid monohydrate and the esterification carried to completion by removing the water of reaction as an azeotrope with the benzene. The reaction mixture was washed free of acid. The solvent and unreacted alcohol were removed by vacuum distillation, finishing at 200° C. pot temperature at 1 mm. pressure. The product (132 g.) was a light colored viscous oil. It was blended with the same oils as were used in Example 1. The results are tabulated below.

*Table II*

A. S. T. M. Pour Points, °F.

| Concentration, Percent | Test Oil A | Test Oil B |
|---|---|---|
| 0 | +30 | +5 |
| 0.25 | −30 | −20 |
| 0.5 | −35 | −20 |
| 1.0 | −35 | −15 |

The blends in test oil A showed perfect pour stability in the cycle A of the S. O. D. Pour Stability test.

EXAMPLE 3

49 grams of maleic anhydride, 112 grams of 1-hexadecene and 250 ml. of xylene were charged into a flask and heated to 130° C. 3 grams of benzoyl peroxide was dissolved in 50 ml. of xylene. This was divided into ten portions, and a portion added periodically to the hot reaction mixture, agitating gently after each addition. Total addition time was two hours. Heating was continued for one-half hour.

The reaction product was esterified by adding 250 grams of Lorol B alcohol, 100 ml. of benzene and 3 grams of p-toluene sulfonic acid, refluxing and removing the water of esterification. The resulting reaction mixture was washed with water until neutral to litmus. The solvents were removed by distillation, and the product finally concentrated by heating to 200° C. at 2 mm. pressure. The product (288 g.) was an orange-colored, viscous liquid. It was separated into two fractions by extracting twice with 2-liter portions of methanol. The methanol soluble portion (75 g.) was only very slightly active as a pour depressant. The portion insoluble in methanol (211 g.) was an active pour depressant. Pour point and pour stability data in test oil A are given in the following table:

*Table III*

| Concentration, Percent | A. S. T. M. Pour Point, °F. | S. O. D. Pour Stability, Cycle A, Solid Point, °F. |
|---|---|---|
| 0.0 | +30 | >+20 |
| 0.013 | +30 | −5 |
| 0.025 | +10 | <−20 |
| 0.05 | +10 | −15 |
| 0.10 | −15 | −15 |
| 0.20 | −25 | −6 |
| 0.30 | −25 | |

EXAMPLE 4

98 grams of 1-tetradecene was copolymerized with 49 grams of maleic anhydride, and the copolymer esterified with Lorol B alcohol using xylene as a diluent and using the technique of Example 3. The resulting product (274 g.) was extracted with methanol. The extract (15 g.) was not an active pour depressant. The methanol-insoluble product (228 g.) was found to be active, giving the following results in test oil A:

Table IV

| Concentration, Percent | A. S. T. M. Pour Point, °F. | S. O. D. Pour Stability, Cycle A, Solid Point, °F. |
|---|---|---|
| 0.0 | +30 | >+20 |
| 0.013 | +30 | −5 |
| 0.025 | +30 | <−20 |
| 0.05 | +10 | −24 |
| 0.10 | −20 | −5 |
| 0.2 | <−35 | +5 |
| 0.3 | <−35 | |

EXAMPLE 5

Example 4 was repeated using 1-dodecene in place of 1-tetradecene. The product was fractionated by methanol extraction into an inactive portion (43 g.) and an active portion (208 g.). The latter was blended with test oil A and the following data obtained.

Table V

| Concentration, Percent | A. S. T. M. Pour Point, °F. | S. O. D. Pour Stability, Cycle A, Solid Point, °F. |
|---|---|---|
| 0.0 | +30 | >+20 |
| 0.013 | +30 | 0 |
| 0.025 | +30 | −10 |
| 0.05 | +20 | <−24 |
| 0.10 | −20 | −10 |
| 0.20 | −25 | 0 |
| 0.30 | <−35 | |

EXAMPLE 6

Example 4 was repeated using 1-decene in place of 1-tetradecene. The yield was 248 grams. This was separated into an inactive fraction (33 g.) and an active fraction (216 g.). The latter was blended with test oil A to obtain the following data:

Table VI

| Concentration, Percent | A. S. T. M. Pour Point, °F. | S. O. D. Pour Stability, Cycle A, Solid Point, °F. |
|---|---|---|
| 0.0 | +30 | >+20 |
| 0.025 | +30 | −5 |
| 0.05 | +20 | <−24 |
| 0.10 | −10 | −10 |
| 0.2 | −30 | +5 |
| 0.3 | <−35 | |

EXAMPLE 7

Example 4 was repeated using 1-octane in place of 1-tetradecene. The yield was 223 g. This was extracted with methanol to yield a methanol soluble portion (17 g.) and an insoluble portion (194 g.). The latter was blended with test oil A and the following data obtained:

Table VII

| Concentration, Percent | A. S. T. M. Pour Point, °F. | S. O. D. Pour Stability, Cycle A, Solid Point, °F. |
|---|---|---|
| 0.0 | +30 | >+20 |
| 0.025 | +30 | +5 |
| 0.05 | +30 | −20 |
| 0.10 | +25 | <−20 |
| 0.20 | −5 | +5 |
| 0.3 | −25 | |

EXAMPLE 8

49 grams of maleic anhydride, 25 grams of 1-octadecene, 22 grams of 1-hexadecene, 20 grams of 1-tetradecene, 17 grams of 1-dodecene and 14 grams of 1-decene and 260 ml. of xylene were charged into a flask and heated to 130° C. 3 grams of benzoyl peroxide was added in portions over a period of two hours. The mixture was heated to refluxing for 15 minutes. 230 grams of Lorol B alcohol and 3 grams of p-toluene sulfonic acid were added, and the mixture refluxed removing the water of esterification. When the esterification was complete, the mixture was cooled and washed free of acid. The solvent was removed by distillation and the product concentrated by heating to 200° at 2 mm. pressure.

Blends in test oil A gave the following results:

Table VIII

| Concentration, Percent | A. S. T. M. Pour Point, °F. | S. O. D. Pour Stability, Cycle A, Solid Point, °F. |
|---|---|---|
| 0.0 | +30 | >+20 |
| 0.25 | +5 | 0 |
| 0.5 | <−35 | +10 |

EXAMPLE 9

A stainless steel bomb was charged with 49 grams of maleic anhydride, 250 ml. of xylene and 3 grams of benzoyl peroxide. The air was displaced with nitrogen, and the nitrogen displaced with ethylene. The bomb was charged to 1100 pounds per square inch with ethylene and heated to 134° C. over a period of 1 hour. The temperature dropped to 90° C. during the next hour and was maintained at 80–90° for four hours. The contents of the bomb were agitated by a rocking motion throughout the reaction period. The bomb was cooled and opened. The contents, partially solid, were transferred to a flask, and benezene and acetone used to rinse the bomb. The acetone was removed by distillation. 250 grams of Lorol B alcohol and 3 grams of p-toluene sulfonic acid were added. Benzene was distilled from the reaction mixture until the pot temperature reached 120° C. The mixture was then refluxed, removing the water of esterification as it was produced. A small amount of solid remained undissolved. This was removed by filtration. The filtrate was washed until free of acid. The solvent was removed by distillation, and the product concentrated by heating to 200° C. at 30 mm. pressure. The residue was extracted with methanol. The methanol extract (95 g.) was inactive as a pour depressant. The portion that was insoluble in methanol (237 g.) was blended with test oil A, and the following data obtained:

Table IX

| Concentration, Percent | A. S. T. M. Pour Point, °F. | S. O. D. Pour Stability, Cycle A, Solid Point, °F. |
|---|---|---|
| 0.0 | +30 | >+20 |
| 0.013 | +15 | 0 |
| 0.025 | +5 | −20 |
| 0.05 | −5 | −20 |
| 0.10 | −15 | −20 |
| 0.20 | −20 | <−20 |
| 0.3 | −20 | |

EXAMPLE 10

The olefin used in this experiment was a fraction of thermally cracked crude scale wax, distilling at 250 to 325° C. The charge was made up of 5 grams of maleic anhydride, 35 grams of olefin and 25 ml. of xylene. The catalyst (0.33 gram of benzoyl peroxide) was dissolved in xylene (5 cc.). This was added to the reaction mixture periodically in five equal portions over a period of two hours, while the temperature was maintained at 130° C. 30 cc. Lorol B alcohol, 1 gram of p-toluene sulfonic acid and 25 ml. of benzene were added and the mixture refluxed. Water of esterification was removed continuously during the refluxing. The reaction mixture was washed until free of acid. The solvent was removed by distillation, and the product concentrated by heating to 200° C. at 30 mm. pressure. The residue was extracted with methanol, and the methanol insoluble portion (34 g.) was blended with the test oil A.

*Table X*

| Concentration, Percent | A. S. T. M. Pour Point, ° F. | S. O. D. Pour Stability, Cycle A, Solid Point, ° F. |
|---|---|---|
| 0.0 | +30 | >+20 |
| 0.10 | −15 | −10 |
| 0.20 | −30 | −5 |
| 0.3 | −30 | |

EXAMPLE 11

49 grams of maleic anhydride and 50 cc. of dihydropyran were heated to 70° C. under an atmosphere of nitrogen. 0.25 gram of benzoyl peroxide was added, and the mixture held at 70 to 80° C. for 20 hours. The product was quite viscous. Another portion of benzoyl peroxide (0.25 g.) was added, and the heating continued for 60 hours. The product was now a stiff gelatinous mass. Lorol B alcohol (250 ml.), p-toluene sulfonic acid (3 g.), and benzene (100 cc.) were added, and the mixture was refluxed to remove the water of esterification. At the end of the esterification period, there was still some insoluble gel. This was removed by filtration, and the filtrate was washed with water until free of acid. The solvent was removed by distillation, and the product concentrated further by heating to 200° C. at 2 mm. pressure. The product (227 g.) was a dark brown syrup. It was blended with test oil A, giving the following results:

*Table XI*

| Concentration, Percent | A. S. T. M. Pour Point, ° F. | S. O. D. Pour Stability, Cycle A, Solid Point, ° F. |
|---|---|---|
| 0.0 | +30 | >+20 |
| 0.25 | +30 | |
| 0.50 | −10 | −25 |
| 1.00 | −25 | <−25 |

EXAMPLE 12

49 grams of maleic anhydride, 92 grams of undecylenic acid and 200 ml. of xylene were mixed and heated to 145° C. 3 grams of benzoyl peroxide was added portionwise over a period of two hours while the temperature was not allowed to drop below 130° C. Heating was continued for one-half hour after the addition of the last portion of catalyst. 350 grams of Lorol B alcohol, ½ g. of p-toluene sulfonic acid and 75 ml. of benzene were added, and the mixture was refluxed. The water of esterification was removed continuously. After the esterification step, the product was washed with water until free of acid. The solvent was removed by distillation, and the product finally heated to 200° C. at 2 mm. pressure. The residue (386 g.) was a dark orange-colored syrup. It was blended with test oil A and the following data were obtained.

*Table XII*

| Concentration, Percent | A. S. T. M. Pour Point, ° F. | S. O. D. Pour Stability, Cycle A, Solid Point, ° F. |
|---|---|---|
| 0.0 | +30 | >+20 |
| 0.1 | +10 | |
| 0.13 | −5 | −5 |
| 0.25 | −15 | +5 |
| 0.50 | −25 | +5 |

The product was extracted twice with methanol, using 10 cc. of methanol per gram of product each time. The methanol extract (180 g.) was only slightly active as a pour point depressant. The portion that was insoluble in methanol (204 g.) was blended with test oil A, and the following data were obtained:

*Table XIII*

| Concentration, Percent | A. S. T. M. Pour Point, ° F. | S. O. D. Pour Stability, Cycle A, Solid Point, ° F. |
|---|---|---|
| 0.0 | +30 | >+20 |
| 0.013 | +30 | 0 |
| 0.025 | +25 | −20 |
| 0.05 | +10 | −20 |
| 0.10 | −5 | 0 |
| 0.20 | −30 | 0 |
| 0.30 | −30 | |

EXAMPLE 13

A flask was charged with 49 grams of maleic anhydride, 150 ml. of 1-octadecene and 200 ml. of toluene. The mixture was heated to 100° C. and a solution of 2 grams of benzoyl peroxide in 15 ml. styrene and 10 ml. of toluene was added thereto, with stirring, over a period of twenty minutes. The mixture was refluxed for one-half hour after the addition had been completed. 227 grams of Lorol B alcohol and 3 grams of p-toluene sulfonic acid were added and the mixture refluxed. Water of esterification was removed continuously. When the esterification was complete, the reaction mixture was washed with water until free of acid. The solvent was removed by distillation with a final heating to 200° C. at 2 mm. pressure. The residue (280 g.) was a viscous liquid, light brown in color. A blend (¼%) in the test oil had a pour point of below −35° F. The product was extracted twice with methanol using ten volumes of methanol per gram of product each time. The extract (60 g.) was only very slightly active as a pour depressant. The methanol insoluble portion (214 g.) was blended with test oil A and the following data were obtained:

*Table XIV*

| Concentration, Percent | A. S. T. M. Pour Point, °F. | S. O. D. Pour Stability, Cycle A, Solid Point, °F. |
|---|---|---|
| 0.0 | +30 | >+20 |
| 0.10 | −5 | −5 |
| 0.20 | −30 | +10 |
| 0.30 | <−35 | |

EXAMPLE 14

49 grams of maleic anhydride, 126 grams of 1-octadecene and 250 ml. of benzene were charged into a flask equipped with a water trap below a reflux condenser. When refluxing conditions are maintained in such an apparatus both air and moisture are excluded from the reaction zone. The mixture was heated to refluxing, and benzoyl peroxide (3 g. in 50 cc. of benzene) was added in portions through the condenser, periodically, during the 6½ hour reaction time. Refluxing was continued for one hour. 115 ml. of absolute ethanol and 3 grams of p-toluene sulfonic acid were added, and the mixture was refluxed through an efficient fractionating column. Water and some alcohol were trapped and removed from the system, while benzene and some alcohol were returned to the system. When the esterification was complete, as indicated by the fact that the reflux became homogeneous, distillation was allowed until the temperature of the reaction mixture reached 85° C. The distillation residue was washed free of acid. Solvent was removed by distillation in the final heating at about 300° C. at 2 mm. pressure. The product was a dark colored, viscous liquid. It was blended with test oil A and the following data were obtained:

*Table XV*

| Concentration, Percent | A. S. T. M. Pour Point, °F. | S. O. D. Pour Stability, Cycle A, Solid Point, °F. |
|---|---|---|
| 0.0 | +30 | >+20 |
| 0.20 | −15 | <−18 |
| 0.25 | −20 | |
| 0.50 | <−35 | |
| 1.00 | <−35 | |

EXAMPLE 15

49 grams of maleic anhydride, 132 grams of 1-octadecene, and xylene (250 cc.) were heated to 130° C. t-butyl hydroperoxide (2 cc. in 8 cc. of xylene) was added over a period of three hours while the temperature was maintained at 130–145° C. Heating was continued for one hour. 250 grams of Lorol B alcohol and 3 grams of p-toluene sulfonic acid were added, and the mixture refluxed removing the water of esterification. After the esterification was complete, the mixture was cooled and washed with water until free of acid. The solvent was removed by distillation ending at 200° at 2 mm. pressure. The residue (262 g.) was extracted twice with methanol using 10 ml. per gram each time. The methanol soluble portion (52 g.) was only slightly active as a pour depressant. The insoluble portion (211 g.) was blended with test oil A and the following data obtained.

*Table XVI*

| Concentration, Percent | A. S. T. M. Pour Point, °F. | S. O. D. Pour Stability, Cycle A, Solid Point, °F. |
|---|---|---|
| 0.0 | +30 | >+20 |
| 0.10 | −25 | −5 |
| 0.20 | −25 | −10 |
| 0.30 | −25 | |

EXAMPLE 16

Experiment 15 was repeated using t-butyl perbenzoate (3 cc. in 47 cc. of xylene) as the polymerization catalyst. The product (240 g.) was blended with test oil A and the following data obtained:

*Table XVII*

| Concentration, Percent | A. S. T. M. Pour Point, °F. | S. O. D. Pour Stability, Cycle A, Solid Point, °F. |
|---|---|---|
| 0.0 | +30 | >+20 |
| 0.013 | +20 | −15 |
| 0.025 | +15 | <−20 |
| 0.05 | −5 | <−20 |
| 0.10 | −15 | <−20 |
| 0.20 | −15 | <−20 |
| 0.30 | −25 | |

EXAMPLE 17

Experiment 15 was repeated using di-t-butyl peroxide (2 cc. in 50 cc. of xylene) as the polymerization catalyst. The product (238 g.) was blended with test oil A and the following data were obtained:

*Table XVIII*

| Concentration, Percent | A. S. T. M. Pour Point, °F. | S. O. D. Pour Stability, Cycle A, Solid Point, °F. |
|---|---|---|
| 0.0 | +30 | >+20 |
| 0.013 | +20 | 0 |
| 0.025 | +20 | <−20 |
| 0.05 | +10 | −20 |
| 0.10 | −10 | <−20 |
| 0.20 | −25 | −20 |
| 0.30 | −20 | |

EXAMPLE 18

Experiment 15 was repeated using as a catalyst aralkyl hydroperoxide X4803–1 obtained from Hercules Powder Company. It contains 6.4% active oxygen. The charge and conditions were the same as in Example 15 except for the catalyst (3 cc. of the above in 50 cc. of xylene). The product (141 g.) was blended with test oil A and the following data obtained:

*Table XIX*

| Concentration, Percent | A. S. T. M. Pour Point, °F. | S. O. D. Pour Stability, Cycle A, Solid Point, °F. |
|---|---|---|
| 0.0 | +30 | >+20 |
| 0.025 | +20 | −15 |
| 0.05 | +5 | −20 |
| 0.10 | −5 | −20 |
| 0.20 | −15 | <−20 |
| 0.30 | −25 | −20 |

EXAMPLE 19

30 grams of the copolymer of itaconic anhydride and 1-octadecene, 62 g. of Lorol B alcohol and 200 ml. of benzene were charged into a flask and heated to boiling. After about 4 hours, 1 g. of p-toluene sulfonic acid was added to catalyze the esterification reaction. Refluxing was continued, removing the water of esterification. After about 24 hours reaction time, the benzene was distilled until the pot temperature reached 170° C. The product was taken up in benzene, washed with water, dried with sodium sulfate and filtered. The solution was concentrated by distillation, finally heating to 200° at 1–2 mm. pressure. The residue (65 g.) was a viscous amber colored fluid. It was blended with lubricating oils and the following data were obtained:

Table XX
BLENDS IN LUBRICATING OIL

| Concentration, Percent | In Oil A, Pour Pt., °F. | In Oil B, Pour Pt., °F. |
|---|---|---|
| 0 | +30 | +5 |
| ¼ | −15 | −10 |
| ½ | −25 | −10 |
| 1 | −30 | −10 |

EXAMPLE 20

A stainless steel bomb was charged with 25 g. of maleic anhydride, 0.75 g. of benzoyl peroxide and 100 ml. of benzene. The bomb was flushed first with nitrogen and then with ethylene. The bomb was vented to the atmosphere and the valves were closed. The bomb was heated to 80° F., the rocker started, and ethylene was admitted to a pressure of 250 pounds per square inch. The pressure was increased by about 200 pounds every fifteen minutes until a pressure of about 900 pounds was obtained. During this time, the temperature rose to about 97° and was maintained at 80–90° F. for the rest of the reaction period. The total reaction time was about seven hours. The bomb was opened (after cooling) and the reaction mixture was transferred to a flask. It consisted of a white solid in a clear liquid. The liquid was distilled from the solid, finally heating to a pot temperature of 100° F. at 1–2 mm. pressure. The residue, 30.5 g., was a white powder. Analyses (58.38% C, 5.07% H) indicates a mol ratio of maleic anhydride to ethylene in the copolymer of 0.85.

30 g. of the copolymer, 115 g. of Lorol B alcohol and ¾ g. of p-toluene sulfonic acid monohydrate were heated at reduced pressure (18 mm.), under an air cooled reflux condenser for seven hours at 150° F. and for six more hours while the temperature rose to 175° F. Under these conditions water of esterification escapes through the condenser. The product was taken up in benzene and washed with water. The benzene was removed by distillation and the product was concentrated further by heating to 200° F. at 1–2 mm. pressure. The product (128 g.) was a very viscous amber colored fluid. The product was a pour depressant for test oil A and a V. I. improver for test oil B.

Table XXI
IN TEST OIL A

| Concentration, Percent | A. S. T. M. Pour Point, °F. |
|---|---|
| 0 | +30 |
| ¼ | −10 |
| ½ | −10 |
| 1 | −10 |

IN TEST OIL B

| Concentration, Percent | Visc. at 100°, SSU | Visc. at 210°, SSU | V. I. |
|---|---|---|---|
| 0 | 149.3 | 43.9 | 115 |
| ½ | 156.0 | 44.9 | 121 |
| 1 | 165.0 | 46.0 | 126 |

EXAMPLE 21

A 1-liter flask was charged with 49 g. of maleic anhydride, 126 g. of octadecene-1 and 200 cc. of benzene. The mixture was brought to reflux temperature and 3 g. of benzoyl peroxide in 50 cc. of benzene was added in portions over a period of 6½ hours. Refluxing was continued for 1 hour. A mixture of 96 g. of octadecylamine and 27 g. laurylamine was added and the benzene removed by distillation until the pot temperature reached 200° C. The water of reaction amounted to 6½ cc. The mixture was then heated to 200° at 2 mm. pressure. The residue, 214 g., had the color and consistency of taffy. A 0.2% blend in test oil A had a pour point of −10° F. and a solid point of −18 in the S. O. D. pour stability test.

Table XXII
IN TEST OIL A

| Concentration, Percent | A. S. T. M. Pour Point, °F. | S. O. D. Pour Stability, Solid Point, °F. | |
|---|---|---|---|
| | | Cycle A | Cycle C |
| 0 | +30 | >+20 | |
| 0.05 | −10 | +15 | |
| 0.1 | −15 | <−25 | |
| 0.2 | −20 | <−18 | <−20 |

EXAMPLE 22

The copolymerization was carried out as in Example 21. Laurylamine (92.5 g.) was added and the benzene distilled to a pot temperature of 175°. The pot temperature was held at this temperature for 5 hours during which time 7½ cc. of water were obtained. The reaction mixture was heated to 200° C. at atmospheric pressure, then to 275° C. at 4 mm. pressure. The residue, 172 g. was a very viscous product. With the test oil indicated above a 0.2% blend had a pour point of −25° F. Pour stability data is as follows:

Table XXIII
IN TEST OIL A

| Concentration, Percent | A. S. T. M. Pour Point, °F. | S. O. D. Pour Stability, Solid Point, °F. | |
|---|---|---|---|
| | | Cycle A | Cycle C |
| 0 | +30 | >+20 | |
| 0.1 | −15 | −20 | |
| 0.2 | −25 | −10 | |

EXAMPLE 23

The reactions were carried out as described in Examples 21 and 22, except one-half quantities of maleic anhydride and octadecene-1 were used. 261 g. of di-n-octadecylamine were condensed with the resulting copolymer to yield 321 g. of soft waxy material after heating to 200° at 3 mm. pressure. A 0.2% blend in the test oil had a pour point of −15°. Pour stability data follows:

Table XXIV
IN TEST OIL A

| Concentration, Percent | A. S. T. M. Pour Point, °F. | S. O. D. Pour Stability, Solid Point, °F., Cycle A |
|---|---|---|
| 0 | +30 | |
| 0.2 | −15 | >+20 |
| 0.5 | −15 | <−25 |

EXAMPLE 24

Same quantities and procedure as Example 23 except that 177 g. of di-n-laurylamine was used. The product 214 g., was a soft wax-like material. A 0.2% blend in the test oil had a pour point of −15° F.

Table XXV
IN TEST OIL A

| Concentration, Percent | A. S. T. M. Pour Point, °F. | S. O. D. Pour Stability, Solid Point, °F., Cycle A |
|---|---|---|
| 0 | +30 | |
| 0.2 | −10 | >+20 |
| 0.5 | −20 | <−25 |
| 1.0 | −25 | |

What is claimed is:

1. A mineral lubricating oil containing a minor proportion sufficient to increase the viscosity index and lower the pour point of said oil, of a relatively high molecular weight copolymer reaction product formed by reacting substantially equimolar proportions of maleic anhydride and a straight chain 1-olefin having up to 20 carbon atoms in the presence of a peroxide type catalyst and thereafter esterifying the copolymer with a mixture of saturated straight chain alcohols ranging from 10 to 18 carbon atoms, but having a major proportion of lauryl alcohol.

2. A composition consisting of a major proportion of a waxy mineral lubricating oil and from 0.01% to 5.0% by weight of an esterified peroxide catalyzed copolymer of substantially equimolar proportions of maleic anhydride and a straight chain aliphatic mono-olefin containing from 2 to 24 carbon atoms wherein the esterification agent is a straight chain aliphatic monohydric alcohol having from 8 to 24 carbon atoms.

3. A composition consisting essentially of a major proportion of a waxy mineral lubricating oil and from 0.01% to 5.0% by weight of an esterified peroxide catalyzed copolymer of substantially equimolar proportions of maleic anhydride and octadecene wherein the esterification agent is a straight chain aliphatic monohydric alcohol having from 8 to 24 carbon atoms.

4. A composition comprising a major proportion of a waxy mineral lubricating oil and from 0.01% to 5.0% by weight of a peroxide catalyzed copolymer of (1) a straight chain aliphatic mono-olefin containing from 2 to 24 carbon atoms with (2) maleic anhydride, said copolymer being modified by condensation in the presence of an esterification catalyst with (3) an aliphatic monohydric alcohol having a chain length within the limits of from 10 to 18 carbon atoms.

SAMUEL B. LIPPINCOTT.
LOUIS A. MIKESKA.

REFERENCES CITED

The following references are of record in the file of this patent:

UNITED STATES PATENTS

| Number | Name | Date |
|---|---|---|
| 2,047,398 | Voss et al. | July 14, 1936 |
| 2,168,535 | Nuesslein et al. | Aug. 8, 1939 |
| 2,200,429 | Perrin et al. | May 14, 1940 |
| 2,301,356 | Arnold et al. | Nov. 10, 1942 |
| 2,327,705 | Frolich et al. | Aug. 24, 1943 |
| 2,342,113 | Blair | Feb. 22, 1944 |
| 2,366,517 | Gleason | Jan. 2, 1945 |
| 2,370,943 | Dietrich | Mar. 6, 1945 |
| 2,375,516 | Blair | May 8, 1945 |
| 2,378,629 | Hanford | June 19, 1945 |
| 2,397,454 | Woodward | Mar. 26, 1946 |
| 2,478,015 | Rust | Aug. 2, 1949 |